United States Patent [19]

Rao et al.

[11] Patent Number: 5,277,997
[45] Date of Patent: Jan. 11, 1994

[54] ABSORBER ASSEMBLY FOR ALKALI SOLUTIONS

[75] Inventors: Bhaskara M. L. Rao, Flemington; William Kobasz, Edison, both of N.J.

[73] Assignee: Alupower, Inc., Warren, N.J.

[21] Appl. No.: 922,146

[22] Filed: Jul. 30, 1992

[51] Int. Cl.$^5$ .............................................. H01M 2/00
[52] U.S. Cl. ........................................ 429/49; 429/65
[58] Field of Search ...................... 429/48, 49, 65, 90, 429/121, 122, 86, 89, 8

[56] References Cited

U.S. PATENT DOCUMENTS

| | | | |
|---|---|---|---|
| 1,583,648 | 5/1926 | Benner | 429/90 X |
| 3,224,906 | 12/1965 | Deibel et al. | 429/65 |
| 4,118,194 | 10/1978 | Raleigh et al. | 429/90 X |
| 4,269,905 | 5/1981 | Wedlake | 429/8 |
| 4,303,745 | 12/1981 | Anderson et al. | 429/86 |

*Primary Examiner*—Anthony Skapars
*Attorney, Agent, or Firm*—Louis E. Marn

[57] ABSTRACT

There is described an absorber assembly for alkali electrolyte solutions comprised of an absorber member including an alkali neutralizing compound disposed within a chamber of a porous material.

9 Claims, 1 Drawing Sheet

ABSORBER ASSEMBLY FOR ALKALI SOLUTIONS

BACKGROUND OF THE INVENTION

1. Field of the Invention

This invention relates to alkali electrochemical battery assemblies, and more particularly, to an absorber assembly for alkali electrolytes associated with the operation of electrochemical battery assemblies.

2. Description of the Prior Art

In U.S. Pat. No. 4,910,104, assigned to the same assignee as the present invention, there is disclosed an electrochemical battery assembly using electrolytes including sea water or any liquid capable of conducting current. Alkaline electrolytes, also include concentrated sodium hydroxide, potassium hydroxide and the like for use in metal/air, silver-zinc, nickel-cadmium, etc. While battery assemblies are designed to prevent electrolyte leakage, electrolyte leakage poses a safety hazard for maintenance crews as well as the battery user. Additionally, there is disposal and/or recycling problems for alkaline electrolytes from environmental considerations.

OBJECTS OF THE PRESENT INVENTION

An object of the present invention is to provide an absorber assembly for the facile collection of alkaline electrolytes.

Another object of the present invention is to provide an absorber assembly for alkaline electrolyte collection readily accomplished in a safe manner.

Still another object of the present invention is to provide an absorber assembly for alkaline electrolyte collection for neutralization into non-toxic chemical compounds.

SUMMARY OF THE INVENTION

These and other objects of the present invention are achieved by an absorber assembly for alkali electrolyte solutions comprised of an absorber member including an alkali neutralizing compound disposed within a chamber of a porous material.

BRIEF DESCRIPTION OF THE DRAWINGS

Further objects and advantages of the present invention will become apparent from the following detailed description when taken with the accompanying drawing, wherein.

DETAILED DESCRIPTION OF THE INVENTION

Figure 1:
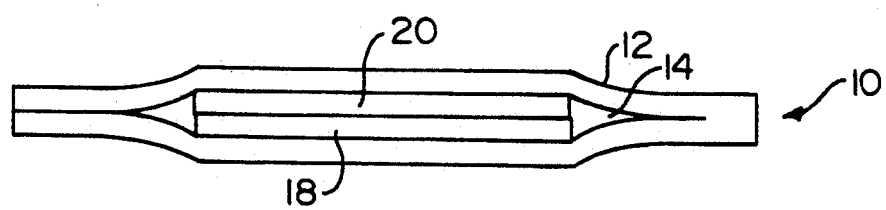
FIG. 1 is a schematic cross-sectional view of the absorber assembly of the present invention.
Figure 2:
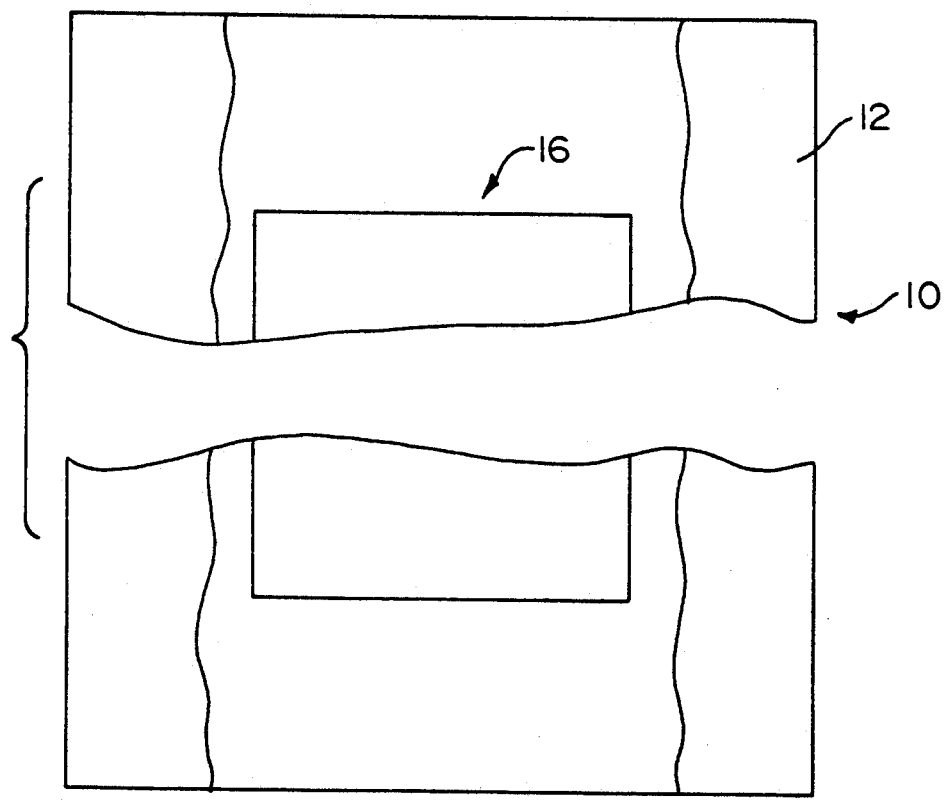
FIG. 2 is a partial plan view of the absorber assembly thereof.

Referring now to the drawing, there is illustrated an absorber assembly, generally indicated as 10, of the present invention and comprised of a container or envelope member 12 defining an inner chamber 14 in which is positioned an absorber/neutralizer member, generally indicated as 16, comprised of an absorber layer or sheet 18 and a layer of neutralizing agent 20, as more fully hereinafter described. The container 12 has been subjected to a temperature of from 80° to 150° C. after positioning of the absorber/neutralizing member 16 to form the product of the present invention.

The container or envelope member 12 is formed of a porous material, such as a non-woven filter paper or cloth, treated paper, recycled polyethylene, polymer foils, sponges and the like to permit the flow of alkali-electrolyte into the envelope towards the absorber/neutralizing member 16. Additionally, the material is selected to provide ready handling by the user. The absorber layer sheet 10 of the absorber/neutralizer member 16 is formed of a material such as cotton, cotten blends of nylon, acetate polyesters and the like in the form of felt or foil exhibiting high moisture take-up rates. The layer of neutralizing agent 20 is formed of a neutralizing agent, such as citric acid and a binder, such as aqueous suspension of polyvinylidine chloride copolymer, styrene butadiene copolymer and the like.

The binder material is selected to form with the free flowing crystalline citric acid a loosely-held lump or dough-like mass which with continued mixing turns into a free-flowing powder subsequently spread onto the absorber layer 18, in the embodiment of the present invention. Application of heat effect thermal bonding of the particles to the absorber member 18 thereby forming a porous cake on the absorber layer 18 including neutralizing agent, i.e., citric acid.

To ensure complete neutralization and facilitate detection, an indicator, such as phenolphthalein (turns colorless from pink) may be incorporated into the absorber member 16 and visible through the envelope 12. In a preferred embodiment of the present invention, the neutralizing agent is citric acid which is a non-toxic compound and which reacts with alkaline electrolytes, such as sodium hydroxide, to form sodium citrate, a non-toxic, non-hazardous and readily disposable compound. Other liquid neutralizing/solid polymeric materials may be used, such as acetic acid/acrylamide gels.

The absorption member 10 of the present invention is readily sized and dimensioned to a specific standard, e.g., one absorption pad per 100 ml of 8N alkali solution or 10 pads per 1 liter. The alkali neutralization capacity of each pad is then a function of the quantity of citric acid in the absorber member 16 with liquid retention being a function of the amount and absorptivity of cotton or like absorption material.

In another embodiment of the present invention, an inert filler material, such as clays, may be admixed with the neutralizer agent and binder in the process of forming the porous cake. The presence of such a filler material in the porous cake reduces the rate of the neutralization reaction and thus the rate of exothermal heat of reaction to facilitate heat transfer to the environment under acceptable conditions by natural conditions, convection and radiation process. Since neutralization reaction may reach temperatures close to 100° C., as a function of reactant material, the use of filler material is required for certain applications.

The absorber member 16, as hereinabove described, is formed of two discrete layers 18 and 20 but may be formed of a unitary configuration by forming porous particulate material of a size readily incorporated into the absorber material wherein the amount of absorber material/porous particulate material is sized to provide unit neutralizing criteria as hereinabove discussed, i.e., one pad per 100 ml of 8N alkali electrolyte (512 gm. of citric acid for 1 1 of 8N alkali solution).

In operation, the alkali flows through the pores of the envelope 12 to the absorber member 16 wherein the alkali is neutralized by the neutralizing agent, such as citric acid. The neutralized alkaline solution, as well as water generated in the neutralization reaction are absorbed by the absorber material, e.g., cotton and retained within the envelope or container 10.

EXAMPLE OF THE INVENTION

Operation of the process is described in the following specific example which is intended to be merely illustrative and the present invention is not to be regarded as limited thereto.

EXAMPLE

A non-woven envelope of a diaper pad (11"×30"×0.5") and weighing 18 grams is cut open to expose one side of an inner cloth absorber pad. A moist mixture of citric acid and a binder (about 95 wt. %) is spread evenly over the surface of the cloth absorber pad. The non-woven envelope is repositioned and the assembly is heat cured uniformly at a temperature of about 80° C. to form an absorber member 10 (11"×30"×1.0" and weighing 80 grams) of the present invention. Such an absorber member 10 is capable of neutralizing and absorbing 100 ml of 8N alkali solution.

While the present invention has been described in connection with an exemplary embodiment thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

What is claimed is:

1. An absorption assembly for contacting alkaline battery electrolytes, which comprises:
   a porous member defining an interior chamber; and
   an absorber member disposed in said interior chamber of said porous member, said absorber member including a compound for neutralizing alkali of said alkaline battery electrolyte to form a non-toxic, non-hazardous and readily disposable compound, said compound and binder being thermally bonded to said absorber member.

2. The absorption assembly as defined in claim 1 wherein said compound is included in a porous substrate.

3. The absorption assembly as defined in claim 2 wherein said compound is citric acid.

4. The absorption assembly as defined in claim 1 and further including a filler material admixed with said compound to control the rate of neutralization.

5. The absorption assembly as defined in claim 1 and further including an indicator of substantially complete neutralization.

6. The absorption assembly as defined in claim 1 wherein said neutralizing agent is present in an amount to neutralize 100 ml of 8N alkali solution.

7. The absorption assembly as defined in claim 6 wherein said absorber member is sized to absorb substantially all water of said 8N alkali solution.

8. The absorption assembly as defined in claim 1 wherein said porous member is formed of a material selected from the group consisting of non-woven filter paper or cloth, treated paper, recycled polyethylene, polymer foils and sponges.

9. The absorption assembly as defined in claim 1 wherein said absorber member is a material selected from the group consisting of cotton, cotton blends of nylon and acetate polyesters.

* * * * *